Aug. 18, 1953
L. E. WOOD ET AL
2,648,980
APPARATUS FOR MEASURING AND RECORDING THE
DIRECTION AND VELOCITY OF WIND
Filed Oct. 27, 1949
5 Sheets-Sheet 1
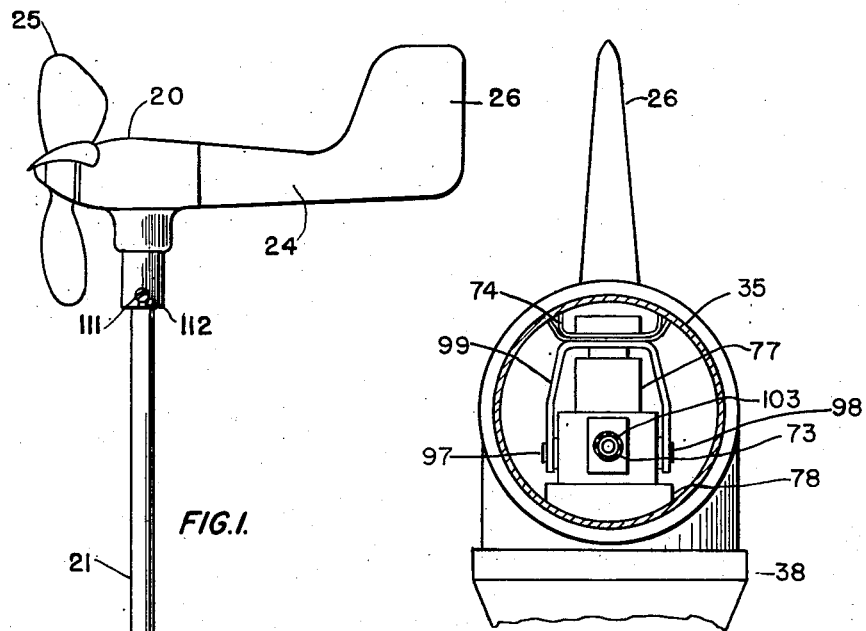
FIG.1.
FIG.14
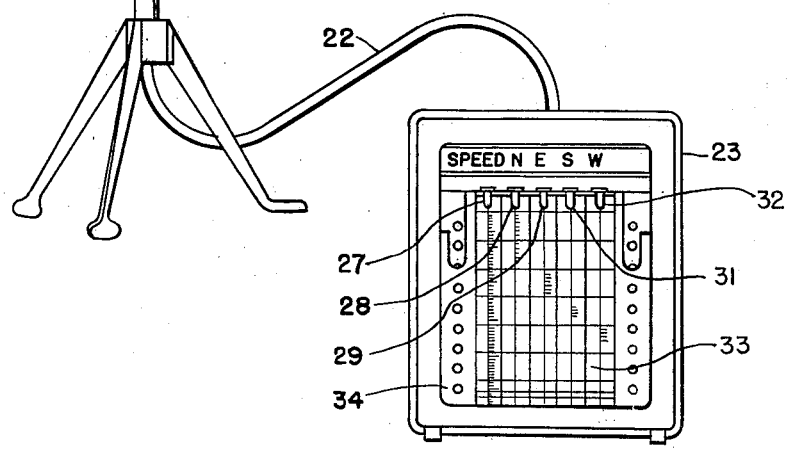
INVENTORS
LOUVAN E. WOOD
VERNON D. HAUCK
BY *Robert F. Peek*
ATTORNEY Aug. 18, 1953   L. E. WOOD ET AL   2,648,980
APPARATUS FOR MEASURING AND RECORDING THE
DIRECTION AND VELOCITY OF WIND
Filed Oct. 27, 1949   5 Sheets-Sheet 2

INVENTORS
LOUVAN E. WOOD
VERNON D. HAUCK
BY Robert J. Peek
ATTORNEY

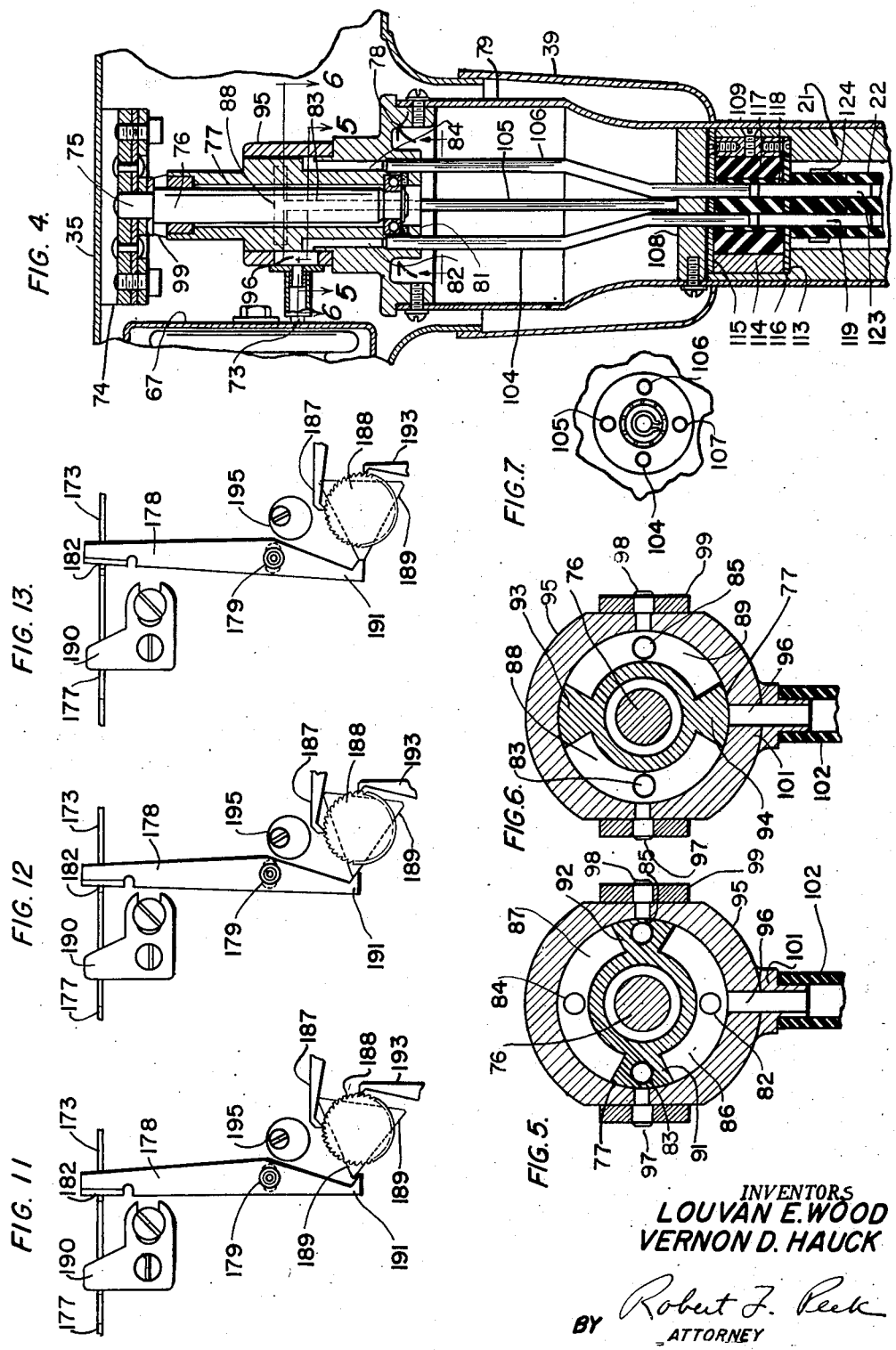

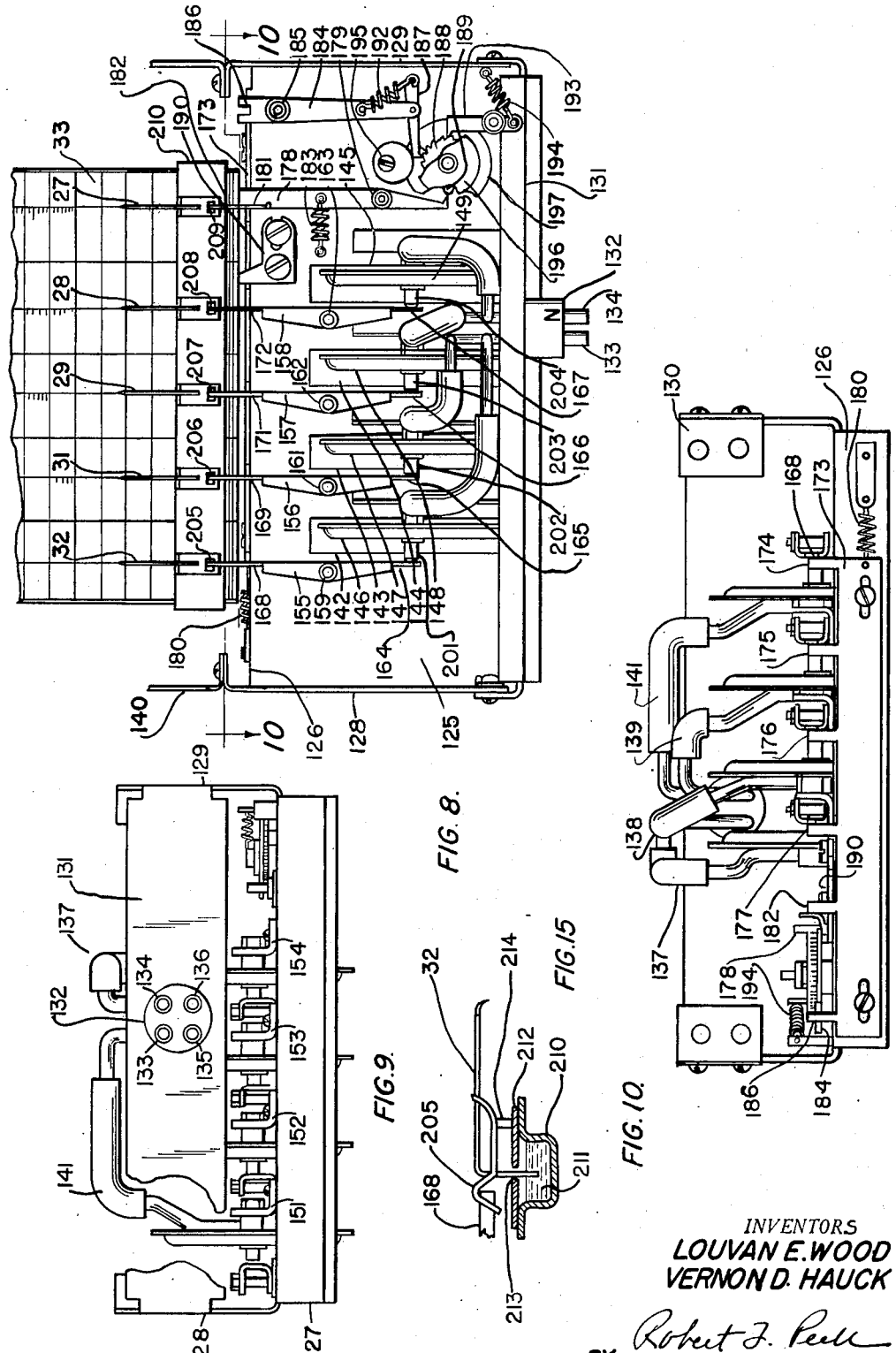

Aug. 18, 1953     L. E. WOOD ET AL     2,648,980
APPARATUS FOR MEASURING AND RECORDING THE
DIRECTION AND VELOCITY OF WIND
Filed Oct. 27, 1949     5 Sheets-Sheet 5

INVENTORS
Louvan E. Wood
Vernon D. Hauck.

BY Robert F. Peck
ATTORNEY

Patented Aug. 18, 1953

2,648,980

UNITED STATES PATENT OFFICE 2,648,980

APPARATUS FOR MEASURING AND RECORDING THE DIRECTION AND VELOCITY OF WIND

Louvan E. Wood, Glen Arm, and Vernon D. Hauck, Towson, Md., assignors to Bendix Aviation Corporation, Baltimore, Md., a corporation of Delaware Application October 27, 1949, Serial No. 123,868

17 Claims. (Cl. 73—189)

This invention relates to apparatus for measuring and recording the velocity and direction of wind wherein its operation requires no external source of power and the operation will remain uninterrupted for periods of time without need for attention.

In many outlying weather stations, there is normally a deficiency of electrical power and it is highly desirable to provide instrumentation for such stations that requires no external source of power. Furthermore, such stations are usually unattended and it is necessary that the instruments function uninterruptedly for periods of time, without attention from an observer.

In the case of a wind measuring instrument, the problem is somewhat simplified because of the power available from the wind itself. Whatever means is utilized to measure wind velocity and direction is, of necessity, actuated by the forces developed by the flow of wind. However, recording wind conditions presents a problem in view of the fact that power is required to transmit the response of the wind sensitive units to a suitable recorder located relatively remote from the units.

The problem is further complicated by virtue of the fact that it is highly desirable to elevate the wind sensitive units to a sufficient height for good exposure to the wind. Under these conditions, it is desirable that some system be utilized to transmit the output of the wind sensitive units to a recording instrument conveniently situated on the ground.

The present invention utilizes a novel pneumatic system for transmitting to the recorder unit the output of the wind responsive units. In essence, the pneumatic system utilizes an expansible chamber associated with means for intermittently varying its volume in response to wind flow of unit velocity, thereby to deliver intermittent impulses of fluid pressure. Also carried by the transmitter is a four-way valve responsive to wind direction for selectively directing the impulse of fluid pressure into at least one of four fluid paths leading away from the transmitter.

The four fluid paths are normally defined by a multi-bored rubber conduit which connects the transmitter to the recorder. Each one of the fluid paths is connected to an expansible chamber device carried by the recorder, and, with this arrangement, it is apparent that the impulse of fluid pressure generated by the transmitter will be carried to at least one of the expansible chamber devices carried by the recorder, thereby causing same to change its volume and thus actuate a recording pen through a suitable linkage system. A conventional clock-driven chart-recording apparatus is provided to cooperate with the recording pens to make a permanent record of wind conditions.

From the above, it is seen that the energy developed by the flow of wind is utilized to actuate the recording apparatus in a novel and useful manner. Furthermore, the novel pneumatic system mentioned above provides means for channelling the energy of the wind in accordance with wind direction so both wind velocity and direction are simultaneously recorded. Thus, it is seen that the present invention provides for recording of wind conditions, the power for operating same being drawn from the wind, the only requirement for attention being the necessity of periodically winding the clock which drives the chart.

The function and operation of the invention will be readily apparent upon an inspection of the drawings annexed hereto, when taken with the description of the invention set forth below.

In the drawings:

Fig. 1 is a view in elevation showing the complete assembly of the invention proposed herein. The wind responsive unit is shown as mounted on a mast or tripod and connected to a recorder by means of a flexible hose.

Fig. 4 is a more detailed sectional showing of its corresponding parts shown in Fig. 2.

Fig. 5 is a sectional view taken along the lines 5—5 in Fig. 4.

Fig. 6 is a sectional view taken along the lines 6—6 in Fig. 4.

Fig. 7 is a bottom view showing that portion of the assembly embraced by lines 7—7 of Fig. 4.

Fig. 8 is a partial plan view of the top of the recorder shown in Fig. 1, with the top cover removed.

Fig. 9 is a back-view in elevation of the mechanism shown in Fig. 8.

Fig. 10 is a front view in elevation showing that part of the mechanism embraced by lines 10—10 in Fig. 8.

Figs. 11, 12, and 13 are exploded views of the ratchet mechanism shown in Fig. 8, showing the several positions of the mechanism over a successive cycle of operations.

Figures 2, 3:
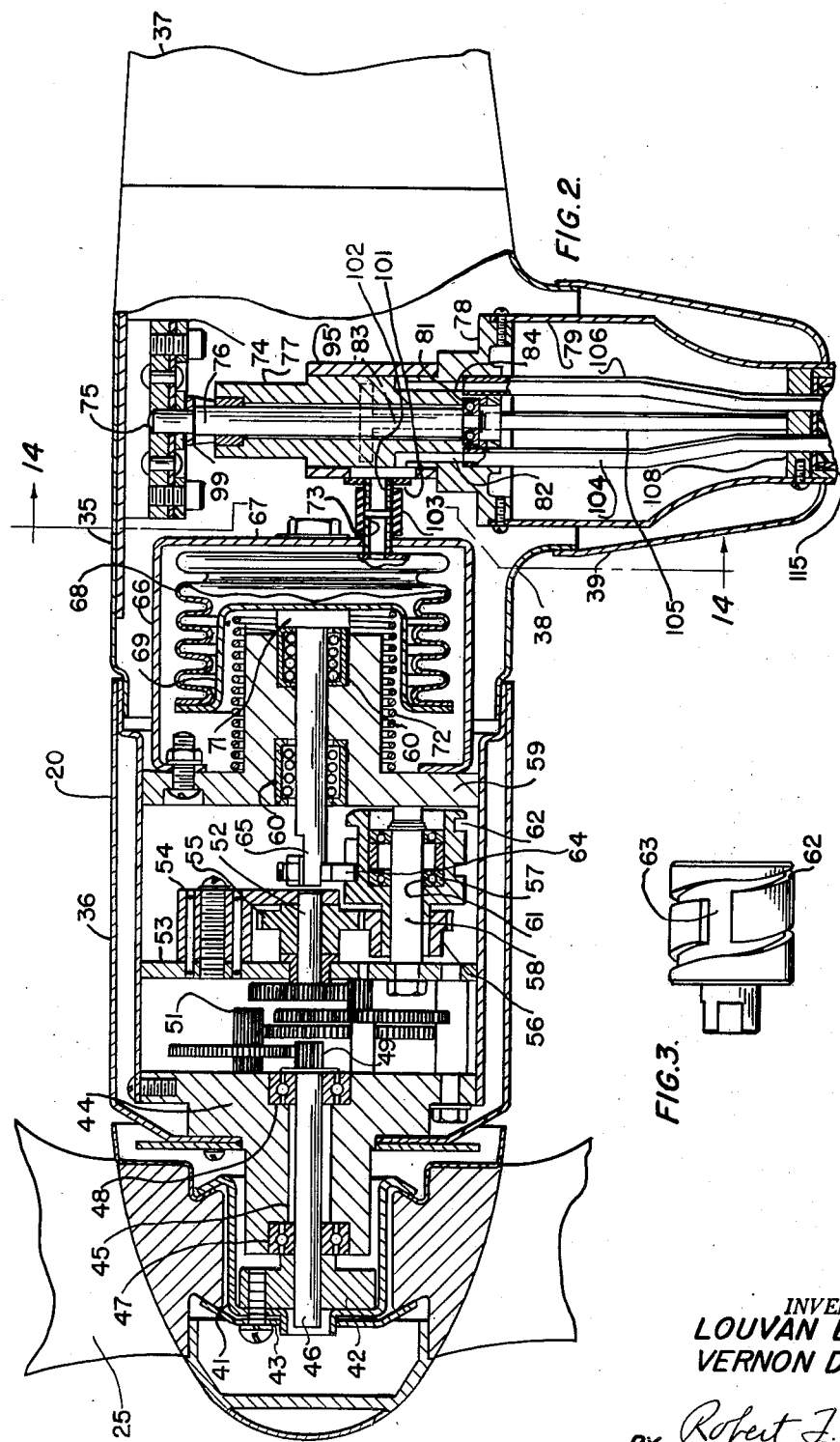
Fig. 2 is a partial view, in elevation, of the transmitter shown in Fig. 1, having a cut-away portion to permit a sectional showing of the inner working parts of the transmitter.
Fig. 3 is a view of the slotted cam shown in Fig. 2, wherein the cam has been rotated approximately 90 degrees in a direction toward the reader.

Fig. 14 is a sectional view along the lines 14—14 in Fig. 2.

Fig. 15 is a side-view in elevation of the inkwell and pen assembly.

Figure 16:
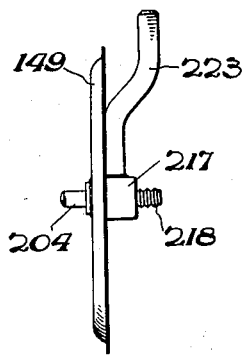

Figure 16 is an enlarged view in elevation showing the assembly of the pressure responsive capsules 146, 147, 148, and 149.

Figure 17:
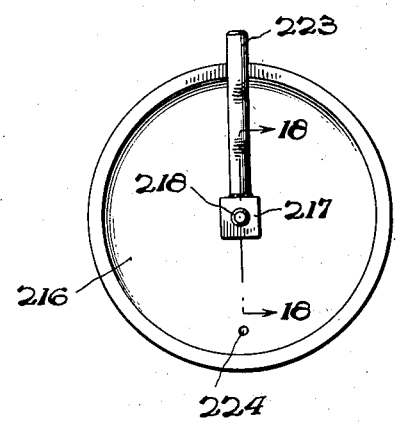

Figure 17 is a side-view of the arrangement shown in Figure 16.

Figure 18:
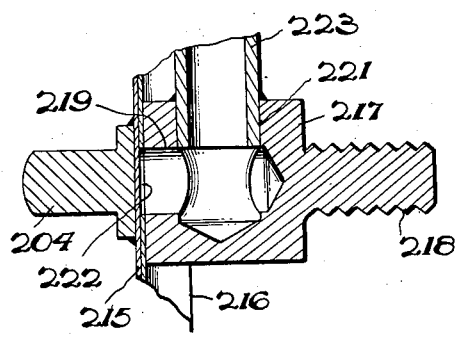

Figure 18 is a partial sectional-view taken along the lines 18—18 in Figure 17.

Referring first to Fig. 1, there is shown the complete assembly of the various units which constitute the present invention. The assembly comprises a transmitter 20 adapted for suitable mounting on a mast 21. Extending from the transmitter and carried within the mast 21 is a flexible rubber conduit 22 which, in turn, is suitably connected to the recorder 23.

The transmitter 20 may be of the type shown in U. S. Patent No. Des. 145,345 issued July 30, 1946, in the name of Louvan E. Wood, and comprises the tubular body portion 24 having a multiblade propeller-type rotor 25 mounted for rotation on its nose and the tail end of the body 24 being formed in the shape of a vertically extending vane 26.

The recorder 23 has associated therewith five recording pens 27, 28, 29, 31, and 32, so arranged as to be actuated in response to wind velocity and the directions north, east, south and west, respectively. Cooperating with the recorder is a chart roll 33 adapted to be moved with relation to the recording pens by means of a conventional clock-driven motor. The recorder 23 has a suitable window 34 arranged in its front face to permit visual inspection of the markings on the chart.

The apparatus is so designed that the rotor 24 will rotate in proportion to wind velocity and by the novel mechanism to be described below, this rotation of the rotor 25 is transmitted to the recording pen 27 so that unit wind velocity can be graphically reproduced on the chart 33. In a similar manner the direction recording pens respond to changes in wind direction as sensed by the vane 26 to give graphic indications of wind direction.

*The transmitter*

The assembly and operation of the transmitter 20 will now be described to illustrate the manner in which wind velocity and direction can be converted into output indications.

For the assembly and operation of the transmitter 20, reference will now be had to Fig. 2, wherein there is shown a partial view in elevation of the transmitter having a portion of its body removed to permit a sectional showing of the inner working parts of the transmitter. The transmitter body 24 comprises a medial section 35, a nose section 36, and a tail section 37. These three sections are suitably connected in any conventional manner to form an integral body. The aforesaid sections 35, 36, 37 have a substantially cylindrical configuration, the medial section 35 having an annular flange 38 projecting from its bottom surface, a shroud 39 being suitably secured to the flange 38.

The rotor 25 is carried by the nose section 36 and is journaled for rotation thereon. The propeller blades of the rotor 25 are secured to a hub 41 which, in turn, may be secured to the collar 42 by means of screws 43, one of which is shown.

The nose section 36 also has affixed thereto a supporting wall 44 which has an over-size bore 45 located centrally thereof for receiving therein the shaft 46. Suitable bearings 47, 48 are arranged in annular recesses in the end faces of wall 44 for journaling the shaft 46 for rotation.

The collar 42 is rigidly secured to the shaft 46 at its nose end, the pinion 49 being secured to the tail end of the shaft 46 extending beyond the inner face of the wall 44.

The pinion 49 drives a gear reduction unit, generally indicated at 51. The gear reduction unit 51 has an output shaft 52 which has one end supported for rotation in the wall 53 and the other end supported for rotation in a bracket 54, rigidly secured to the wall 53. The shaft 52 has integrally associated therewith a gear 55 which, in turn, engages a gear 56 provided with a suitable bore for receiving therein the end projecting from cam 57, the gear 56 and cam 57 constituting an integral unit when assembled. The cam 57 and its associated end are substantially hollow and are journaled for rotation about the shaft 58 which has one extremity secured to the wall 53 and its other extremity secured to the wall 59. The bearing arrangement 61 provides for substantially frictionless rotation of the cam 57.

With the aforementioned assembly in mind, it is apparent that the movement of the rotor 25 causes the shaft 46 to rotate, which, in turn, causes the shaft 52 to rotate at a reduced speed by virtue of the gear reduction unit 51 coupling the two shafts together. Rotation of the shaft 52 causes corresponding rotation of gears 55 and 56, which causes cam 57 to rotate, the rotation of cam 57 being proportional to the rotation of the rotor 25.

The gears 55, 56 may be supplied in different matching sizes for producing an output indication corresponding to kilometers or miles per hour, or knots whichever is desirable.

The cam 57 has a helical slot 62 arranged about its peripheral surface and also has a substantially axial slot 63 in its peripheral surface which intersects adjacent spirals of the helical slot 62. A cam follower 64 rides in the slots 62, 63, the follower being rigidly secured to a rod 65 slidably supported within the wall 59 by means of linear roller bearings 60. In the arrangement shown, the cam 57 rotates in a clockwise direction when viewed from the nose end of the transmitter 20. The rotation of the cam 57 will cause the follower 64 to move axially in a direction toward the nose end of the transmitter until such time as the follower 64 is in proximity to the axial slot 63. In this position of the cam 57, the slot 63 permits the follower 64 to move axially to its starting position.

A U-shaped strap 66 having an end portion 67 is secured to the tail face of the wall 59. Rigidly affixed to the end portion 67 and located in proximity to its inner surface is one end of a flexible corrugated metallic bellows 68. The other end of the metallic bellows 68 is in the form of a cup 69 which has secured thereto the enlarged head 71 of the rod 65. A compression spring 72 surrounds the enlarged central portion of wall 59 and has its ends abutting the wall 59 and the cup 69, respectively. With such an arrangement, it is apparent that the cam 57 moves the cam follower 64 and its associated rod 65 to overcome the biasing force established by spring 72, until such time as the follower 64 is in proximity to the slot 63 of the cam 57. With the parts in this position, the spring 72 will cause the rod 65 to rapidly travel to its innermost position. Thus, the rod 65 continuously reciprocates and the number of reciprocations in any given time interval is proportional to the revolutions of the cam 57 during the time interval.

The reciprocation of rod 65 permits the interior volume defined by the bellows 68 to expand relatively slowly and thence to contract relatively rapidly. The rapid contraction or compression of the bellows 68 has the effect of momentarily raising the pressure within the bellows 68; that is to say, an impulse of fluid pressure is generated by the action of the bellows 68. Furthermore, each increase in pressure corresponds to a predetermined quantity of wind flowing past the transmitter and, therefore, the number of pressure impulses established in a given time interval establishes the total wind flow in a given time interval, which, of course, is a measure of wind velocity. A tube 73 is affixed to the tail end of the bellows 68 and has its bore in communication with the interior of the bellows.

A strap assembly 74 has its ends secured to the inner walls of the medial section 35, the strap assembly 74 having an aperture located centrally thereof for receiving therein the reduced end 75 of a vertical shaft 76. The shaft 76 and strap assembly 74 are rigidly secured together. Surrounding the shaft 76 is a substantially cylindrical post 77 which has its bottom 78 rigidly secured to a cylindrical member 79 extending downwardly therefrom. The member 79 projects through the shroud 39 and provides the means for rigidly supporting the transmitter 20 to the mast 21 in a manner to be later described. The post 77 has arranged centrally of its bottom portion 78 the bearings 81 which serve as a combination thrust and rotating bearings for the shaft 76. Thus, it is apparent that any movement of the transmitter body 24 will cause its associated shaft 76 to rotate in a proportionate amount.

Extending upwardly from the bottom surface of the post 77 are the ports 82, 83, 84, 85, the ports being spaced equidistantly about the axis of the post 77; that is to say, the ports are 90° apart. The ports 82, 84, terminate in a pair of horizontal ports 86, 87, each of which subtends an angle of approximately 135° about the periphery of the post 77. In a similar manner, the ports 83, 85, terminate in a pair of horizontal ports 88, 89, each of which also subtends an angle of 135° about the periphery of post 77. It is to be noted that the ports 88, 89 are located above the ports 86, 87. A pair of lands 91, 92, separate the port 86 from the port 87 and a pair of lands 93, 94, separate the port 88 from the port 89. Surrounding the post 77 is a collar 95 which has an elongated vertical orifice 96 so dimensioned as to be adapted to register with either of the ports 86, 87 or 88, 89. The collar 95 has a pair of pins 97, 98 projecting from the opposite sides thereof and these pins are adapted to cooperate with a U-shaped bracket 99 rigidly secured to the assembly of the strap assembly 74 and shaft 78. The manner in which the U-shaped bracket 99 is assembled to the remaining parts of the structure is best shown in Fig. 14. The legs of the bracket 99 extend downwardly from the strap assembly 74 and the ends of the legs are slotted to receive therein the pins 97, 98. Thus, it is seen that any rotation of the transmitter body 24 will cause rotation of the U-shaped bracket 99 which, in turn, will cause the collar 95 to rotate about the post 77 to position the orifice 96 in accordance with wind direction. The orifice 96 and the four ports 86, 87, 88, 89 constitute a distribution valve assembly for controlling the path of impulses of pressure.

Affixed to the collar 95 so as to cover the orifice 96 is a plate 101, the plate having a tube 102 located centrally thereof and extending toward the nose end of the transmitter. The interior of the tube 102 communicates with the orifice 96. The ends of the tube 73 and the tube 102 are substantially in juxtaposition, but not necessarily connected together, there being a rubber tube 103 surrounding the ends and sealingly engaging same. The last-mentioned arrangement permits the orifice 96 to be in communication with the interior of the bellows 68.

The ports 82, 83, 84, 85 are slightly enlarged at their lower extremities so as to receive the metallic tubes 104, 105, 106, 107. The tubes can be suitably soldered or brazed into place so that same are rigidly secured to post 77. These tubes project downwardly through the interior of tubular member 79 and are brought together as shown to extend through a suitably apertured annular disc 108 rigidly secured within the reduced end 109 of member 79. The reduced end 109 fits over the upper end of the mast 21 and is properly positioned thereon by means of a bolt 111, which engages the slot 112 in the reduced end 109. The bolt 111 is arranged to face south, for purposes of orientation during assembly of the transmitter on the mast.

The mast 21 comprises a hollow tube and has an annular shoulder 113 at its upper extremity. A coupling assembly is supported on the shoulder 113 and comprises a cylindrical member 114 to which is rigidly secured by screws a top and bottom circular plate 115 and 116, respectively. The member 114 may be secured by screws to the mast 21. The plate 115 is suitably apertured to receive therethrough the projecting ends of the tubes 104, 105, 106, 107. Confined within the cylindrical volume defined by the coupling assembly is a suitable sealing arrangement which, in this case, comprises an outer rubber tube 117, which, in turn, confines an inner rubber tube 118, the tube 118 being suitably apertured to receive therein the projected ends of the tubes 104, 105, 106, 107. The plate 116 is suitably apertured to register with the apertures in rubber tube 118 and a series of relatively short metallic tubes 119, 121, 122, 123 project upwardly into the rubber sealing assembly and are rigidly secured to the plate 116, as by brazing. The rubber conduit 22 engages the lower end of the tubes 119, 121, 122, 123 and is suitably apertured to coact therewith. The conduit 22 connects the transmitter 20 to the recorder 23. A conventional hose clamp 124 may be used to hold the conduit 22 in place.

The coupling assembly comprising the member 114 and plates 115, 116 also serves in combination with the upper extremity of the mast 21 as the supporting means of the transmitter 20, by virtue of the disc 108 resting thereon.

From the above, it is apparent that the interior of the bellows 68 is in communication with the four paths in the conduit 22, by means of tube 73, tube 102, orifice 96, ports 86, 87, 88, 89, ports 82, 83, 84, 5, tubes 104, 105, 106, 107, short rubber hose 118 and the tubes 119, 121, 122, and 123.

As the transmitter 20 is rotated by the vane 26 in response to wind direction, the orifice 96 will be rotated about the post 77. Such rotation of the orifice 96 will place the interior of the bellows 68 in communication with at least one of the ports 86, 87, 88, 89 and no more than two of these ports, at any given position of the orifice 96. In the position shown in Figs. 5 and 6, it is apparent that the orifice 96 is in communication solely with port 86 by virtue of the fact that the land 94 prevents communication with either of the ports 88, 89. Still referring to Figs. 5 and 6, if the orifice 96 is moved in a clockwise direction, the interior of the bellows 68 will be in communication with the ports 86, 88, whereas for counterclockwise rotation of orifice 96, the interior of the bellows 68 will be in communication with the ports 86, 89. As designed, the ports 86, 87, 88, 89 correspond to the cardinal compass directions north, south, east, and west, respectively.

The tube 123 is directly opposite the bolt 111 and corresponds to the south direction. Suitable markings on the conduit 22 are provided to match its openings to the right tube so that the other end of the conduit 22 can be properly oriented with respect to the recorder 23.

From the above, it is apparent that the transmitter 20 is continuously delivering impulses of fluid pressure to the conduit 22, the particular path of the impulses being determined by the position of the orifice 96.

Recorder

Referring now to Figs. 8, 9, 10, 11, 12 and 13, the assembly and operation of the recorder will be described.

As stated above, the recorder 23 comprises a conventional clock-driven chart recorder arranged within a suitable housing and provided with a window 34 for observation of the markings on the chart 33. This part of the recording mechanism is conventional and forms no part of the subject invention and, for reasons of clarity and brevity, there is omitted any description of the operation of the driving mechanism for the chart and its associated parts. However, the invention contemplates the use of a novel recording pen actuating mechanism which can be suitably secured to the recorder assembly. The aforementioned mechanism comprises a plate 125 having depending front and back walls 126, 127, respectively, and a pair of vertically extending side walls 128, 129, respectively. Suitably secured to the side walls 128, 129 is a back plate 131. The side walls 128, 129 have their front ends 130 turned in so as to permit securing of same to the turned in side walls 140 of the recorder 23. In this manner the pen-actuating mechanism is carried by the recorder.

The back plate 131 carries a plug jack 132 having the tubes 133, 134, 135, 136 projecting therefrom. As shown, the tube 134 is marked with an "N" to represent the direction north. Thus, the tubes 136, 135, 133 correspond to the directions east, south, and west, respectively. The plug jack 132 extends through the back plate 131 and has projecting from its forward extremity the tube assemblies 137, 138, 139, 141. The plate 125 has a plurality of cut-away sections 142, 143, 144, 145 to permit the positioning of a plurality of pressure responsive capsules 146, 147, 148, 149. The construction of the capsules will be best understood upon reference to Figures 8, 9, 10, 16, 17, and 18. Referring first to Figure 16, and by way of example, the capsule shown is designated as 149 and comprises a pair of thin flexible metallic shells, assembled in nesting relationship and hermetically joined together at their periphery. The outer shell, partially shown in Figure 18 and designated as 215 has affixed thereto, by means of soldering, or welding, or the like, a driving stud 204. In a similar manner, driving studs 201, 202, and 203 are affixed to capsules 146, 147, and 148 respectively. The inner shell of capsule 149, partially shown in Figure 18 and designated as 216, has affixed thereto by means of soldering, or welding, or the like, the stud-support 217. Stud 217 has a threaded portion 218 for cooperating with an aperture in bracket 154, the bracket 154 being rigidly secured to plate 125 by means of screws or the like. A nut cooperates with threaded portion 218 and bracket 154 to rigidly mount the capsule 149 on the bracket member. In a similar manner, capsules 146, 147, and 148 have stud-supports affixed thereto for mounting the capsules on plate supported brackets 151, 152, and 153 respectively.

The stud 217 has a pair of bores 219 and 221, intersecting at right angles, the bore 219 communicating with the interior of the nested shells by means of aperture 222 in shell 216. The bore 221 has soldered therein the tube 223, which in turn is an integral part of tube assembly 137. In a like manner, tube assemblies 138, 139, and 141 connect to the support studs of capsules 146, 147, and 148 respectively.

With shells 215 and 216 assembled as shown, their enclosed volume is very nearly zero, so that the pressure impulses delivered by the transmitter will have a maximum effect thereon.

Each capsule is provided with a breather port similar to orifice 224 shown in capsule 149. These breather ports permit each capsule to adjust itself to changes in ambient atmospheric pressure and temperature, thereby eliminating any errors that could be caused by variations in same. Furthermore, such breather ports eliminate the possibility of condensation occurring within the capsule assemblies and associated parts. It is to be noted that the breather ports are in the form of relatively small orifices, thereby permitting the capsules to respond properly to the pressure impulses transmitted thereto.

A plurality of rocker arms 155, 156, 157, 158 are pivoted to the plate 125 by means of pivot shafts 159, 161, 162, 163 and the rocker arms have their rear extremities 164, 165, 166, 167, extending so as to be in juxtaposition to driving studs 201, 202, 203, 204, respectively, affixed to the pressure responsive capsules. The front ends 168, 169, 171, 172, of the rocker arms are adapted to actuate the recording pens 32, 31, 29, 28, in a manner which is best understood by reference to Fig. 15. In Fig. 15, it is seen that the pens 32, 31, 29, 28, 27, are carried by pen-connecting links 205, 206, 207, 208, 209. An inkwell 210 is mounted on the recorder proper, the well having a supply of ink 211 and a lid 212 having a series of apertures, one of which is shown at 213. The recording pens are conventional capillary ink-fed pens; that is, hollow tubes with points affixed to the front ends, and, as shown in Fig. 15, the rear ends being bent downwardly so as to project through the apertures in the lid of the inkwell below the surface of the ink. The pen-connecting links are pivoted for rotation with respect to the lid 212 by means of pivot arrangements, one of which is shown in Fig. 15, and is designated by the number 214. The forward ends of the pen-connecting links support the pens approximately at their middle point. The rearward ends of the pen-connecting links are in the form of an inverted V, the ends of the V-section being forked so as to grip the front ends 168, 169, 171, 172 of the direction rocker arms, and the front end 181 of the speed rocker arm.

The above arrangement results in reciprocating motion of the recording pens in response to any reciprocating motion of the corresponding rocker arms. Thus, the pens will continuously record a straight line on the chart until actuated by their associated pressure capsule (or velocity rocker arm, in the case of velocity), at which time, a short mark is made at right angles to the normal straight-line marking.

Cooperating with the front ends of the rocker arms and adapted to be actuated thereby is the slide-bar 173, which is slidably mounted upon the front wall 126 by means of a bolt and slot arrangement. The slide-bar 173 has a plurality of vertically projecting tongues 174, 175, 176, 177, each of the tongues being located in juxtaposition to the ends 168, 169, 171, 172 of the rocker arms. A spring 180 has one end affixed to the wall 126 and the other end affixed to the slide-bar 173 to return the slide-bar 173 and the rocker arms to their normal position after same have been moved under the influence of the moving ends of pressure responsive capsules. A stop, 190, cooperates with tongue 177 to limit motion of slide-bar 173.

The rocker arms 155, 156, 157, 158, comprise the wind direction components of the recording mechanism and their associated pens will produce suitable markings on the chart 33 in response to any actuation of the arms. The impulses of fluid pressure travelling through the conduit 22 are selectively transmitted to the pressure responsive capsules and these capsules will undergo a momentary expansion in volume in response to the impulse in fluid pressure, thereby causing the driving studs 201, 202, 203, 204, to actuate the rocker arms. The frequency of the impulses will determine the number of markings made by the direction recording pens in any given time interval. The total number of markings in the time interval of recording will be indicative of the wind velocity during the time interval and for this reason, it is apparent that wind velocity can be determined solely from the wind direction markings. However, with the normal shifting of the wind encountered, it would be necessary for an observer to follow three or four tracks on the chart to determine wind velocity. Such an arrangement would be relatively complicated and to simplify the determination of wind velocity, a fifth recording pen 27 is arranged to give velocity markings along a single track on the chart in response to actuation of the direction recording pens.

The pen 27 is carried by a rocker arm 178 having suitable pivot arrangements 179 for permitting the arm 178 to move with respect to the plate 125. The forward end 181 of the rocker arm 178 cooperates with a fifth tongue 182 carried by the slide-bar 173. A spring 183 is provided to urge the arm 178 against the tongue 182. With this arrangement, it is obvious that any movement of the slide-bar 173 will cause corresponding movement of the arm 178, which, in turn, will cause the pen 27 to make a mark on the chart. Thus, a single track of velocity markings is provided, for the slide-bar 173 is actuated in response to each impulse of pressure delivered by the transmitter 20.

With the arrangement so far described, a series of uniform markings will be provided on the chart to indicate velocity.

To further facilitate reading the chart, a suitable mechanism has been provided to amplify every tenth actuation of the arm 178 which, in turn, will produce an amplified marking on the chart so that each tenth velocity marking can be readily distinguished from the balance of the markings. To provide for this motion amplification, an auxiliary rocker arm 184 is pivoted at 185 with respect to the plate 125. The ends of the arm 184 are forked around an auxiliary tongue 186 provided on the slide-bar 173. A pawl 187 is carried by the other end of the arm 184 and cooperates with a toothed ratchet wheel 188 which, in turn, is suitably mounted for rotation with respect to the plate 125. The ratchet wheel 188 carries a triangular cam 189 which cooperates with the rear extremity 191 of the rocker arm 178.

The pawl 187 is pivotally mounted on arm 184 and is properly biased by spring 192. A second pawl 193 is pivotally mounted on plate 125 and is designed so as to engage ratchet wheel 188 and prevent movement thereof when the pawl 187 is being returned to its starting position. Spring 194 maintains the pawl 193 against the ratchet wheel. An adjustable stop 195 cooperates with pawl 187 to prevent over-travel of same. The ratchet wheel 188 has a pair of cylindrical plates 196, 197 affixed to its faces to form guides for the engaging edges of pawls 187, 193.

As the slide-bar 173 reciprocates in response to impulses of pressure delivered by the transmitter 20, the auxiliary rocker arm 184 and its associated pawl 187 will cause the cam 189 to be rotated in a step-by-step fashion. Such rotation will bring an apex of the cam 189 in proximity to the rear extremity 191 of the rocker arm 178. On the tenth actuation of the auxiliary arm 184 during each cycle of actuations, the apex of cam 189 will deliver an additional kick to the rocker arm 178 and thus amplify its total motion about the pivot 179. The amplification of the total motion of rocker arm 178 will result in amplified motion of the recording pen 27, which, in turn, will produce an amplified marking of the chart. Figs. 11, 12, and 13 show the sequence of the operation described above. In Fig. 11, the arm 178 is in its starting position against the tongue 182. In Fig. 12, the slide-bar 173 has been actuated by an impulse of pressure and the arm 178 correspondingly actuated. The tongue 177 is against stop 190 in this position. Simultaneously, the arm 184 has actuated the pawl 187, which, in turn, moves the cam 189 against the extremity of arm 178, giving same an extra kick to amplify its motion. This motion amplification is shown by the separation of arm 178 from its associated tongue 182.

*Operation of the complete assembly*

The transmitter 20 is designed so that 1255 revolutions of the rotor 25 represent one mile of wind flow past the transmitter. The cam 57 makes one complete revolution per unit of wind velocity, whether the measurement be in miles per hour, knots, or kilometers per hour. The gears 55, 56 can be matched to the particular speed scale desired. In the case of miles per hour, the cam 57 will make one revolution per mile of wind flow.

In like manner, the bellows 64 will deliver one impulse of pressure for each mile of wind flow and the recording pens will make one mark for each mile of wind flow. In the recorder selected, the chart moves three (3) inches per hour, the chart being conveniently divided first into hours and then subdivided into two-minute intervals to permit an accurate reading of velocities of short duration.

For any selected hour's movement of the chart, the total number of pen markings will represent the total miles of wind flow; that is to say, miles per hour wind velocity. Furthermore, the total markings will be a measure of average velocity throughout the recording interval. Instantaneous values of wind velocity can be determined upon interpolation of adjacent markings during a selected time interval.

Assuming that the wind is coming from the north direction, the bellows 68 will generate impulses of fluid pressure in accordance with the magnitude of wind velocity. These impulses of pressure will be transmitted to port 86 of the distributor valve assembly from whence it will be transmitted to pressure capsule 149. The capsule 149 will actuate the pen 28 to produce direction markings on the chart 33. Simultaneously with the actuation of pen 28, slide-bar 173 will actuate pen 27 to produce velocity markings on the chart.

If the wind direction shifts from almost true north to north-east, the impulses of pressure will be divided among the ports 86 and 88 and the pressure capsules 149 and 148, respectively, will simultaneously respond to the divided impulse of pressure to actuate the pens 28 and 29, respectively. As before, actuation of the pens 28 and 29 will also cause actuation of the pen 27. Thus for each impulse of pressure generated by bellows 68, the velocity pen 27 will be actuated once, notwithstanding the fact that one or two direction pens are actuated, as the case may be.

What is claimed and desired to be secured by United States Letters Patent is:

1. In apparatus responsive to wind velocity and direction, in combination: means for confining a fluid under substantially constant pressure; means for intermittently changing the pressure of said confined fluid in response to wind flow of a predetermined quantity; a plurality of means adapted to be actuated in response to said changes in fluid pressure; and valve means responsive to wind direction for selectively determining which of said last-named means shall be actuated in response to said changes in fluid pressure, said valve means being interposed between said first-named means and said last-named means.

2. In apparatus responsive to wind velocity and direction, in combination: means for confining a fluid under substantially constant pressure; means for intermittently changing the pressure of said confined fluid in response to wind flow of a predetermined quantity; a plurality of means adapted to be actuated in response to said changes in fluid pressure; valve means responsive to wind direction for selectively determining which of said last-named means shall be actuated in response to said changes in fluid pressure, said valve means being interposed between said first-named means and said last-named means; and means responsive to the actuation of said plurality of means for recording each actuation thereof.

3. In apparatus responsive to wind velocity and direction, in combination: a first expansible chamber; means for intermittently varying the volume of said chamber in response to wind flow of a predetermined quantity; a plurality of second expansible chambers communicating with said first chamber whereby the volume of said second chambers can be varied intermittently in response to the variations in volume of said first chamber, each of said second chambers corresponding to one of the four cardinal compass directions; means responsive to wind direction interposed between said first chamber and said second chambers for selectively communicating said first chamber with said second chambers in a predetermined manner; and individual means operatively linked to each of said second chambers and adapted to be actuated in response to variations in volume of said second chambers.

4. In apparatus responsive to the velocity and direction of wind, in combination: a first expansible chamber; means for intermittently varying the volume of said first chamber in response to wind flow of a predetermined quantity; a plurality of second expansible chambers communicating with said first chamber whereby the volume of said second chambers can be varied intermittently in response to the variations in volume of said first chamber; means interposed between said first chamber and said second chambers for selectively varying communication therebetween in a predetermined manner in response to wind direction; individual means operatively linked to each of said second chambers and adapted to be individually actuated in response to variations in volume of each of said second chambers, and means for recording each actuation of each of said last-named means during a predetermined interval of time.

5. In apparatus responsive to the velocity and direction of wind, in combination: a first expansible chamber; means for intermittently varying the volume of said first chamber in response to wind flow of a predetermined quantity; a plurality of second expansible chambers communicating with said first chamber whereby the volume of said second chambers can be varied intermittently in response to the variations in volume of said first chamber; means interposed between said first chamber and said second chambers for selectively varying communication therebetween in a predetermined manner in response to wind direction; individual means operatively linked to each of said second chambers and adapted to be individually actuated in response to variations in volume of each of said second chambers; a member actuated by any one of said individual means; and means for recording each actuation of said member and each actuation of each of said individual means.

6. In apparatus responsive to the velocity and direction of wind, in combination: a first expansible chamber; means for intermittently varying the volume of said first chamber in response to wind flow of a predetermined quantity; a plurality of second expansible chambers communicating with said first chamber whereby the volume of said second chambers can be varied intermittently in response to the variations in volume of said first chamber; means interposed between said first chamber and said second chambers for selectively varying communication therebetween in a predetermined manner in response to wind direction; individual means operatively linked to each of said second chambers and adapted to be individually actuated in response to variations in volume of each of said second chambers; a member actuated by any one of said individual means; means for recording each actuation of said member and each actuation of each of said individual means; and means for periodically amplifying the actuation of said member in response to a predetermined number of actuations of said member, said recording means serving to indicate that amplified actuation.

7. In combination, a transmitter responding to wind velocity and direction; means carried by said transmitter for generating an impulse of fluid pressure in response to a predetermined quantity of wind flow; four paths carried by said transmitter for directing the flow of said impulse of fluid pressure, said paths corresponding to the cardinal compass directions north, south, west and east; valve means carried by said transmitter responsive to wind direction for directing said impulse of fluid under pressure in at least one of said paths; flexible means coupled to said transmitter for carrying said four paths to a point remote from said transmitter; a recorder stationed at said remote point and including four fluid pressure responsive means, said flexible means being coupled to said recorder for connecting each of said paths to a corresponding fluid pressure responsive means; four pens carried by said recorder, each one of said pens being operatively linked to a corresponding fluid pressure responsive means and adapted to be moved thereby to record wind direction; and a chart cooperating with said pens, said chart moving at a predetermined rate past said pens.

8. In combination, a transmitter responding to wind velocity and direction; means carried by said transmitter for generating an impulse of fluid under pressure in response to a predetermined quantity of wind flow; four paths carried by said transmitter for directing the flow of said impulse of fluid pressure, said paths corresponding to the cardinal compass directions north, south, west, and east; valve means carried by said transmitter responsive to wind direction for directing said impulse of fluid under pressure in at least one of said paths and no more than two of said paths corresponding to adjacent cardinal compass directions; flexible means coupled to said transmitter for carrying said four paths to a point remote from said transmitter; a recorder stationed at said remote point and including four fluid pressure responsive means, said flexible means being coupled to said recorder for connecting each of said paths to a corresponding fluid pressure responsive means; four pens carried by said recorder, each one of said pens being operatively linked to a corresponding fluid pressure responsive means and adapted to be moved thereby to record wind direction; and a chart cooperating with said pens, said chart moving at a predetermined rate past said pens.

9. In combination, a transmitter responding to wind velocity and direction; means carried by said transmitter for generating an impulse of fluid under pressure in response to each predetermined quantity of wind flow; four paths carried by said transmitter for directing the flow of said impulse of fluid pressure, said paths corresponding to the cardinal compass directions north, south, west and east; valve means carried by said transmitter responsive to wind direction for directing said impulse of fluid under pressure in at least one of said paths and no more than two of said paths corresponding to adjacent cardinal compass directions; flexible means coupled to said transmitter for carrying said four paths to a point remote from said transmitter; a recorder stationed at said remote point and including four fluid pressure responsive means, said flexible means being coupled to said recorder for connecting each of said paths to a corresponding fluid pressure responsive means; four pens carried by said recorder, each one of said pens being operatively linked to a corresponding fluid pressure responsive means and adapted to be moved thereby to record wind direction; a chart cooperating with said pens, said chart moving at a predetermined rate past said pens; a fifth pen carried by said recorder; and means for moving said fifth pen in response to each impulse of fluid pressure transmitted to said fluid pressure responsive means thereby to record unit quantity of wind flow.

10. In combination, a transmitter responding to wind velocity and direction; means carried by said transmitter for generating an impulse of fluid under pressure in response to a predetermined quantity of wind flow; four paths carried by said transmitter for directing the flow of said impulse of fluid pressure, said paths corresponding to the cardinal compass directions north, south, west and east; valve means carried by said transmitter responsive to wind direction for directing said impulse of fluid under pressure in at least one of said paths and no more than two of said paths corresponding to adjacent cardinal compass directions; flexible means coupled to said transmitter for carrying said four paths to a point remote from said transmitter; a recorder stationed at said remote point and including four fluid pressure responsive means, said flexible means being coupled to said recorder for connecting each of said paths to a corresponding fluid pressure responsive means; four pens carried by said recorder, each one of said pens being operatively linked to a corresponding fluid pressure responsive means and adapted to be moved thereby to record wind direction; a chart cooperating with said pens, said chart moving at a predetermined rate past said pens; a fifth pen carried by said recorder; means for moving said fifth pen in response to each impulse of fluid pressure transmitted to said fluid pressure responsive means thereby to record unit quantity of wind flow; and means responsive to movement of said fifth pen for periodically amplifying the motion of said fifth pen, the said amplified pen movement producing a chart marking different from the chart markings for normal movements of said fifth pen.

11. In apparatus responsive to wind velocity and direction, in combination: a first member rotating in response to quantity of wind flow; a flexible bellows having closed ends; means for expanding and then collapsing said bellows in response to a predetermined number of rotations of said rotating member; a plurality of pressure responsive capsules communicating with the interior of said bellows, a second member rotating in response to wind direction; valve means actuated by the rotation of said second member and interposed between said bellows and said capsules, said valve means operating to selectively communicate the interior of said bellows with the interior of said capsules in a predetermined manner; and individual means operatively linked to each of said capsules and adapted to be actuated in response to changes in volume of said capsules.

12. In apparatus responsive to wind velocity and direction, in combination: a first member rotating in response to quantity of wind flow; a flexible bellows having closed ends; means for expanding and then collapsing said bellows in response to a predetermined number of rotations of said rotating member; a plurality of pressure responsive capsules communicating with the interior of said bellows; each of said pressure responsive capsules corresponding to one of the four cardinal compass directions, north, east, south, west, respectively; a second member rotating in response to wind direction; valve means actuated by the rotation of said second member and interposed between said bellows and said capsules, said valve means operating to selectively communicate the interior of said bellows with the interior of at least one of said capsules and no more than two of said capsules corresponding to adjacent cardinal compass directions; and individual means operatively linked to each of said capsules and adapted to be actuated in response to changes in volume of said capsules.

13. The combination defined by claim 12, wherein means are provided for recording each actuation of said means linked to said capsules.

14. In apparatus responsive to wind velocity and direction, in combination: a first member rotating in response to quantity of wind flow; a flexible bellows having closed ends; means for expanding and then collapsing said bellows in response to a predetermined number of rotations of said rotating member; a plurality of pressure responsive capsules communicating with the interior of said bellows; each of said pressure responsive capsules corresponding to one of the four cardinal compass directions, north, east, south, west, respectively; a second member rotating in response to wind direction; valve means actuated by the rotation of said second member and interposed between said bellows and said capsules, said valve means operating to selectively communicate the interior of said bellows with the interior of at least one of said capsules and no more than two of said capsules corresponding to adjacent cardinal compass directions; individual means operatively linked to each of said capsules and adapted to be actuated in response to changes in volume of said capsules; a first member adapted to be actuated by each actuation of said first means; and means for recording each actuation of said individual means and said first member.

15. The combination defined by claim 14, wherein there is provided a second member adapted to be actuated by each actuation of said individual means, said second member serving to periodically amplify the actuation of said first member in response to a predetermined number of actuations of said individual means.

16. In apparatus responsive to wind velocity and direction, in combination: a first member rotating in response to quantity of wind flow; a flexible bellows having closed ends; means for expanding and then collapsing said bellows in response to a predetermined number of rotations of said rotating member; a second member rotating in response to wind direction; an orifice in said second member; means placing said orifice in communication with the interior of said bellows; a fixed post on which said second member rotates; a first pair of diametrically disposed ports located on said post; a second pair of diametrically disposed ports located on said post at right angles to said first pair of ports, said pairs of ports being axially displaced on said post, each port of said pairs subtending a peripheral angle on said post greater than 90° but less than 180°, said orifice being elongated so as to register with both pairs of ports; a plurality of pressure responsive capsules corresponding to each port of said pairs, each of said capsules having a breather port; means for communicating the interior of said capsules with its respective port; and individual means operatively linked to each of said capsules and adapted to be actuated in response to a change in volume of its associated capsules.

17. The combination defined by claim 16, wherein means are provided to record each actuation of said means operatively linked to said capsules.

LOUVAN E. WOOD.
VERNON D. HAUCK.

References Cited in the file of this patent

UNITED STATES PATENTS

| Number | Name | Date |
| --- | --- | --- |
| 282,985 | Hesse | Aug. 14, 1883 |
| 2,236,114 | Randl | Mar. 25, 1941 |
| 2,264,181 | May | Nov. 25, 1941 |
| 2,391,601 | Thomas et al. | Dec. 25, 1945 |